US007581034B2

(12) United States Patent   (10) Patent No.: US 7,581,034 B2
Polivy et al.   (45) Date of Patent: Aug. 25, 2009

(54) SENDING NOTIFICATIONS TO AUXILIARY DISPLAYS

(75) Inventors: Daniel J. Polivy, Seattle, WA (US); Matthew P. Rhoten, Kirkland, WA (US); Roger H. Wynn, Redmond, WA (US); Michael S. Bernstein, Bothell, WA (US); Andrew J. Fuller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 10/996,371

(22) Filed: Nov. 23, 2004

(65) Prior Publication Data

US 2006/0164324 A1    Jul. 27, 2006

(51) Int. Cl.
*G06F 15/16* (2006.01)
(52) U.S. Cl. ........................... 709/250; 719/321
(58) Field of Classification Search .............. 709/206, 709/250; 719/321
See application file for complete search history.

(56) References Cited

U.S. PATENT DOCUMENTS

| 4,860,342 A | 8/1989 | Danner .................. 379/96 |
| 5,159,445 A | 10/1992 | Gitlin |
| 5,412,417 A | 5/1995 | Tozuka |
| 5,487,181 A | 1/1996 | Dailey |
| 5,491,800 A | 2/1996 | Goldsmith |
| 5,519,772 A | 5/1996 | Akman |
| 5,533,115 A | 7/1996 | Hollenbach |
| 5,546,538 A | 8/1996 | Cobbley |
| 5,568,540 A | 10/1996 | Grecko .................. 379/88.25 |
| 5,657,414 A * | 8/1997 | Lett et al. ................ 386/35 |
| 5,675,374 A | 10/1997 | Kohda ................... 348/14.1 |
| 5,675,810 A | 10/1997 | Sellers |
| 5,764,901 A | 6/1998 | Skarbo |
| 5,768,164 A | 6/1998 | Hollon |
| 5,802,305 A | 9/1998 | McKaughan |

(Continued)

FOREIGN PATENT DOCUMENTS

EP    0772327 A2    5/1997

(Continued)

OTHER PUBLICATIONS

U.S. Appl. No. 11/509,437, filed Aug. 23, 2006, Bear.

(Continued)

*Primary Examiner*—Andrew Caldwell
*Assistant Examiner*—Oleg Survillo
(74) *Attorney, Agent, or Firm*—Workman Nydegger (57) ABSTRACT

Described is a system and method by which application programs running on a main computer system communicate with an auxiliary display device (such as a cell phone, pocket-sized computer, alarm clock, television, digital picture frame and so forth) to provide viewable information on the device, remote control capabilities, and notifications. Via API calls, programs provide information in the same format regardless of the device capabilities and/or the connection type. An auxiliary display platform converts a notification into a format understood by a device driver, which then filters the notification as desired for its particular hardware device before the notification is communicated. Return communications return data such as status and user interaction with the displayed information. Software vendors may thus write code once to output notifications on auxiliary displays, while hardware manufacturers can have their devices work as auxiliary displays, with little or no modification to existing hardware.

34 Claims, 8 Drawing Sheets

U.S. PATENT DOCUMENTS

| | | | |
|---|---|---|---|
| 5,907,604 A | 5/1999 | Hsu | |
| 5,959,622 A | 9/1999 | Greer | |
| 5,991,836 A | 11/1999 | Renda | |
| 5,999,613 A | 12/1999 | Nabkel | |
| 6,006,285 A | 12/1999 | Jacobs | |
| 6,052,442 A | 4/2000 | Cooper et al. | 379/88.19 |
| 6,101,610 A | 8/2000 | Beebe | |
| 6,144,363 A | 11/2000 | Alloul | 345/618 |
| 6,144,644 A | 11/2000 | Bajzath et al. | 370/259 |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 | 5/2001 | Stanford et al. | 379/110.01 |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,380,968 B1 | 4/2002 | Alexander | |
| 6,390,371 B1 | 5/2002 | Armga | |
| 6,417,849 B2 | 7/2002 | Lefebvre | |
| 6,438,216 B1 | 8/2002 | Aktas | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,484,019 B1 | 11/2002 | Aklian | |
| 6,496,860 B2 | 12/2002 | Ludtke | |
| 6,507,356 B1 | 1/2003 | Jackel et al. | 348/14.06 |
| 6,513,128 B1 | 1/2003 | Wang | |
| 6,516,356 B1 | 2/2003 | Belknap et al. | |
| 6,518,957 B1 | 2/2003 | Lehtinen | 345/173 |
| 6,519,335 B1 | 2/2003 | Bushnell | |
| 6,546,262 B1 | 4/2003 | Freadman | |
| 6,603,855 B1 | 8/2003 | Cannon et al. | 379/377 |
| 6,628,194 B1 | 9/2003 | Hellebust | 340/7.5 |
| 6,628,267 B2 | 9/2003 | Karidis | |
| 6,658,095 B1 | 12/2003 | Yoakum | |
| 6,671,356 B2 | 12/2003 | Lewis | 379/88.13 |
| 6,671,743 B1 | 12/2003 | Verity | 709/321 |
| 6,674,457 B1 | 1/2004 | Davies | |
| 6,680,845 B2 | 1/2004 | Agata | |
| 6,691,233 B1 | 2/2004 | Gannage | |
| 6,718,183 B1 | 4/2004 | Blust | |
| 6,731,316 B2 | 5/2004 | Herigstad et al. | 715/864 |
| 6,732,365 B2 | 5/2004 | Belknap | |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,816,881 B1 | 11/2004 | Mohindra | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,918,123 B1 | 7/2005 | Shteyn | |
| 6,937,950 B2 | 8/2005 | Cragun | |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,000,237 B1 | 2/2006 | Sinha | |
| 7,036,110 B2 | 4/2006 | Jeyaraman | |
| 7,085,814 B1* | 8/2006 | Gandhi et al. | 709/208 |
| 7,123,370 B2 | 10/2006 | Watanabe | |
| 7,221,331 B2* | 5/2007 | Bear et al. | 345/1.1 |
| 7,227,511 B2* | 6/2007 | Adan et. al. | 345/2.1 |
| 7,231,229 B1 | 6/2007 | Hawkins | |
| 7,272,660 B1* | 9/2007 | Powers et al. | 709/238 |
| 7,292,588 B2 | 11/2007 | Milley | |
| 7,302,637 B1 | 11/2007 | Maguire | |
| 7,401,053 B2 | 7/2008 | Kamimura | |
| 2001/0040551 A1 | 11/2001 | Yates et al. | 345/156 |
| 2002/0004855 A1 | 1/2002 | Cox | |
| 2002/0015020 A1 | 2/2002 | Mobin | 345/156 |
| 2002/0080967 A1 | 6/2002 | Abdo | |
| 2002/0087225 A1 | 7/2002 | Howard | |
| 2002/0099456 A1 | 7/2002 | McLean | |
| 2002/0114430 A1 | 8/2002 | Murata | |
| 2002/0131072 A1 | 9/2002 | Jackson | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0025674 A1 | 2/2003 | Watanabe | |
| 2003/0037180 A1 | 2/2003 | Madineni et al. | 709/321 |
| 2003/0046448 A1 | 3/2003 | Fischer | |
| 2003/0069689 A1 | 4/2003 | Ihara | |
| 2003/0074590 A1 | 4/2003 | Fogle | |
| 2003/0112325 A1 | 6/2003 | Boyden et al. | 348/14.16 |
| 2003/0118003 A1 | 6/2003 | Geck | |
| 2003/0122874 A1 | 7/2003 | Dieberger | |
| 2003/0131148 A1 | 7/2003 | Kelley et al. | 717/101 |
| 2003/0146903 A1 | 8/2003 | Yi | |
| 2003/0188041 A1* | 10/2003 | Fillmore | 709/318 |
| 2003/0197685 A1 | 10/2003 | Yi | |
| 2003/0227471 A1 | 12/2003 | Eglit | |
| 2004/0103144 A1 | 5/2004 | Sallam | |
| 2004/0114032 A1 | 6/2004 | Kakii | 348/14.08 |
| 2004/0128359 A1* | 7/2004 | Horvitz et al. | 709/207 |
| 2004/0135819 A1 | 7/2004 | Maa | |
| 2004/0141012 A1 | 7/2004 | Tootill | 345/827 |
| 2004/0155956 A1 | 8/2004 | Libbey | 348/14.16 |
| 2004/0177361 A1 | 9/2004 | Bernhard et al. | 719/321 |
| 2004/0210628 A1 | 10/2004 | Inkinen | |
| 2004/0221204 A1* | 11/2004 | Johnson | 714/47 |
| 2004/0222977 A1 | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter et al. | 361/683 |
| 2004/0240650 A1 | 12/2004 | Bear | 455/426.1 |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | 713/1 |
| 2005/0182822 A1 | 8/2005 | Daniel | |
| 2005/0186942 A1 | 8/2005 | Griffin | |
| 2005/0193396 A1* | 9/2005 | Stafford-Fraser et al. | 719/328 |
| 2005/0259032 A1 | 11/2005 | Morris | |
| 2005/0262302 A1 | 11/2005 | Fuller | |
| 2006/0007051 A1 | 1/2006 | Bear | 345/1.1 |
| 2006/0048062 A1 | 3/2006 | Adamson | |
| 2006/0061516 A1 | 3/2006 | Campbell | |
| 2006/0095525 A1* | 5/2006 | Mousseau et al. | 709/206 |
| 2006/0129855 A1* | 6/2006 | Rhoten et al. | 713/320 |
| 2006/0130072 A1* | 6/2006 | Rhoten et al. | 719/321 |
| 2006/0130075 A1* | 6/2006 | Rhoten et al. | 719/328 |
| 2006/0164324 A1 | 7/2006 | Polivy | 709/206 |
| 2006/0284787 A1 | 12/2006 | Bear | |
| 2007/0136730 A1* | 6/2007 | Wilt et al. | 718/102 |

FOREIGN PATENT DOCUMENTS

| | | |
|---|---|---|
| EP | 0777394 A1 | 6/1997 |
| EP | 000816990 | 1/1998 |

| | | | |
|---|---|---|---|
| EP | 0838934 | A1 | 4/1998 |
| EP | 0772327 | A3 | 2/1999 |
| WO | WO9602049 | A1 | 1/1996 |
| WO | 03/085960 | | 10/2003 |

OTHER PUBLICATIONS

U.S. Appl. No. 11/559,821, filed Nov. 14, 2006, Bear.
U.S. Appl. No. 11/685,014, filed Mar. 12, 2007, Bear.
Anonymous, International Search Report in Corresponding EP Application No. EP 04 00 9868.
Office Action dated Aug. 6, 2008 cited in U.S. Appl. No. 10/429,943.
Office Action dated Aug. 20, 2006 cited in U.S. Appl. No. 10/429,933.
Office Action dated Feb. 14, 2007 cited in U.S. Appl. No. 10/429,905.
Office Action dated May 21, 2007 cited in U.S. Appl. No. 10/429,905.
Office Action dated Apr. 4, 2006 cited in U.S. Appl. No. 10/429,930.
Office Action dated Jul. 14, 2006 cited in U.S. Appl. No. 10/429,930.
Office Action dated Nov. 14, 2006 cited in U.S. Appl. No. 10/429,930.
Notice of Allowance dated Mar. 16, 2007 cited in U.S. Appl. No. 10/429,930.
Office Action dated Aug. 9, 2005 cited in U.S. Appl. No. 10/429,932.
Office Action dated Oct. 4, 2005 cited in Appl. No. 10/429,932.
Office Action dated Mar. 17, 2006 cited in U.S. Appl. No. 10/429,932.
Office Action dated Aug. 15, 2006 cited in U.S. Appl. No. 10/429,932.
Notice of Allowance dated Jan. 25, 2007 cited in U.S. Appl. No. 10/429,932.
Office Action dated Mar. 16, 2006 cited in Appl. No. 10/677,101.
Office Action dated Sep. 6, 2006 cited in U.S. Appl. No. 10/677,101.
Notice of Allowance dated Feb. 2, 2006 cited in U.S. Appl. No. 10/677,101.
Office Action dated Mar. 26, 2007 cited in U.S. Appl. No. 10/429,931.
Office Action dated Sep. 26, 2006 cited in U.S. Appl. No. 10/430,369.
Office Action dated Mar. 20, 2007 cited in U.S. Appl. No. 10/430,369.
Office Action dated Jan. 3, 2007 cited in U.S. Appl. No. 10/429,903.
Office Action dated Feb. 6, 2007 cited in U.S. Appl. No. 10/429,943.
Office Action dated Jul. 6, 2007 cited in Appl. No. 10/429,943.
Office Action dated Mar. 6, 2007 cited in U.S. Appl. No. 10/429,933.
Office Action dated Aug. 10, 2005 cited in U.S. Appl. No. 10/677,084.
Office Action dated Jan. 19, 2006 cited in U.S. Appl. No. 10/677,084.
Office Action dated Nov. 1, 2006 cited in U.S. Appl. No. 10/677,084.
Oxford On-line Dictionary, http://dictionary.oed.com/entrance.dtl, Oxford University Press 2007, on the definition of the word "physical" under III/7b.
Office Action dated Jul. 31, 2007 cited in related U.S. Appl. No. 10/677,084.
Office Action dated Jul. 27, 2007 cited in related U.S. Appl. No. 10/996,557.
Office Action dated Jul. 30, 2007 cited in related U.S. Appl. No. 10/430,369.
Office Action dated Jul. 6, 2007 cited in related U.S. Appl. No. 10/429,943.
Notice of Allowance dated Sep. 7, 2007 cited in related U.S. Appl. No. 10/429,931.
Office Action dated Sep. 24, 2007 cited in related U.S. Appl. No. 10/429,933.
Office Action dated Feb. 15, 2008 cited in related U.S. Appl. No. 10/429,933.
Notice of Allowance dated Jan. 30, 2008 cited in related U.S. Appl. No. 10/429,931.
Office Action dated Mar. 21, 2008 cited in related Appl. No. 10/966,557.
Office Action dated Sep. 28, 2007 cited in related U.S. Appl. No. 10/429,943.
Office Action dated Mar. 26, 2008 cited in related U.S. Appl. No. 10/428,943.
Office Action dated Mar. 18, 2008 cited in related U.S. Appl. No. 10/677,118.
Office Action dated Oct. 15, 2007 cited in related U.S. Appl. No. 10/429,903.
Notice of Allowance dated Apr. 2, 2008 cited in related U.S. Appl. No. 10/429,903.
Notice of Allowance dated Apr. 23, 2008 cited in related U.S. Appl. No. 10/430,369.
Office Action dated Jan. 11, 2008 cited in related in U.S. Appl. No. 10/677,084.
Notice of Allowance dated Apr. 29, 2008 cited in related U.S. Appl. No. 10/677,084.
Office Action dated May 15, 2008 cited in related U.S. Appl. No. 11/837,302.
Office Action dated Nov. 28, 2008 cited in U.S. Appl. No. 10/677,118.
Office Action dated Jan. 2, 2009 cited in U.S. Appl. No. 11/837,302.
Notice of Allowance dated Feb. 6, 2009 cited in U.S. Appl. No. 10/429,943.
Office Action dated Feb. 20, 2009 cited in U.S. Appl. No. 11/053,186.
Office Action dated Feb. 19, 2009 cited in U.S. Appl. No. 10/996,558.
Office Action dated Oct. 15, 2008 cited in U.S. Appl. No. 11/509,437.
Office Action dated Oct. 20, 2008 cited in U.S. Appl. No. 11/509,431.
Office Action dated Nov. 6, 2008 cited in U.S. Appl. No. 10/996,557.

* cited by examiner

SENDING NOTIFICATIONS TO AUXILIARY DISPLAYS

FIELD OF THE INVENTION

The invention relates generally to computer systems, and more particularly to an improved system and method for communicating information between a computer system and an auxiliary device.

BACKGROUND OF THE INVENTION

U.S. patent application Ser. Nos. 10/429,930 and 10/429,932 (Now U.S. Pat. Nos. 7,240,228 and 7,221,331, respectively) are generally directed towards the concept of computer systems having auxiliary processing and auxiliary mechanisms that provide some auxiliary computing functionality. For example, a small LCD on the lid or side of a laptop computer can provide its owner with useful information, such as a meeting location nand time, even when the main computer display is not easily visible, e.g., when a laptop's computer lid is closed and/or the main computer is powered down. Controls such as a set of user-selectable responses or supported actions, such as in the form of buttons may be provided to allow the user to interact with the auxiliary device, such as to choose a response to a notification, view different types of data, scroll through appointments among calendar data, read email messages, read directions, and so forth.

Somewhat similar to an auxiliary LCD screen built into a mobile host computer, a mobile telephone, a music playing device, a pocket-sized personal computer, a personal digital assistant and so forth can serve as an auxiliary device to a main computer when connected to it physically and/or via a wireless (e.g., Bluetooth or infrared) link, as long as the device is programmed to allow its display and/or other functionality to be leveraged by the main computer. In general, any device with I/O capabilities that can interface in virtually any way with a computer system can potentially serve as an auxiliary computing device.

However, there are many varieties of devices that can serve as an auxiliary display for a computer system. For example, some devices can connect to a computer system via a hard-wired connection such as USB, while other devices connect via wireless protocols such as 802.11, 802.16 or Bluetooth. Some, such as "smart" mobile phones and pocket-sized computing devices provide reasonably good graphics, available memory, and may be already arranged to connect to a host computer system in some way. Other devices are more limited, however, and may, for example, only provide a single line of text, lights, and/or audio. At the same time, there are many types of software programs that run on a main computer system and would benefit from being able to output information to an auxiliary display.

What is needed is a way for manufacturers of hardware devices that can be used as auxiliary displays to interface with a host computer system, in a manner that requires little if any change to contemporary hardware devices. At the same time, such a solution should allow application programs to be written to use auxiliary displays, independent of the type of auxiliary display device actually in use. This would be particularly valuable for notifications, which will likely be a desirable reason for using an auxiliary display.

SUMMARY OF THE INVENTION

Briefly, the present invention provides a system and method by which application programs running on a main computer system communicate with an auxiliary display device (such as a cell phone, pocket-sized computer, clock, television, digital picture frame and so forth) to provide viewable information on the device, remote control capabilities, and notifications. To this end, application programs and the like such as written by independent software vendors communicate with an auxiliary display platform via an application programming interface (API) set, which in turn converts the information as needed into a format understood by a device driver of an auxiliary computing device. The device driver filters the information as desired and formats it for its particular hardware device, which may be coupled to the system via any wired or wireless connection. The device driver forwards the data to an appropriate hardware interface for communicating to the auxiliary device. A return communication path from the auxiliary device to the main computer system is also provided.

By abstracting out the type of auxiliary device and/or how it is connected, only a predefined protocol and data format are needed for a program to communicate with a wide variety of devices, that likely have different capabilities. To utilize an auxiliary display, an independent software vendor simply calls the API to the auxiliary display platform, providing a parameter (or parameters) corresponding to data in an agreed upon format for the API. Thereafter, the data is converted to a format understood by a device driver that interfaces with the auxiliary display platform, whereby the device driver may adjust the information as needed before forwarding it to the hardware interface (transport) for communication to its corresponding auxiliary device.

In one alternative, a hardware vendor may choose to implement Microsoft®-based firmware (e.g., comprising a Tiny-CLR-based firmware stack) and thereby guarantee that the user will receive a full auxiliary device experience. For example, if configured with the TinyCLR-based firmware stack, little if any filtering is required, as any program data provided via the API is known to be capable of being handled by the auxiliary device. The data is communicated via an agreed upon format/protocol, and thus the device driver and/or the API layer need only convert the application program-provided data to the appropriate format and forward it according to the protocol to the hardware transport. Because the type of auxiliary device is known to have an appropriate firmware stack, the format may be proprietary.

In another alternative, a possibly-reduced (but still valuable) experience is available to those devices having simpler needs and capabilities with respect to handling the program data, provided via the same API. To this end, device drivers that run on the main computer system implement defined hardware interfaces to seamlessly extend the auxiliary display platform to any type of auxiliary device. Components above the device driver may filter and/or convert the ISV-supplied data, such that the data is provided to the device driver in a predefined format that the device driver understands. The device driver may also filter the data as appropriate for its corresponding auxiliary device, e.g., to remove graphics from data for its corresponding auxiliary device when such a device is only capable of displaying text. Hardware devices capable of running code may choose to have some or virtually all of the device driver functionality run on the device instead of in the device driver on the main computer.

Note that much of the interface/wire protocol used by the device drivers to provide the data to a hardware transport interface may be defined to be the same regardless of the connection mechanism being used. As a result, device drivers may share a certain amount of code, even though the actual connection mechanism may be different. By using this mechanism, devices appear to work consistently regardless of how they are attached.

For notifications, an API is provided by which a program author may make calls into the auxiliary display platform to provide notifications on the auxiliary display. The notification may include data such as text, a header, icon, and controls, such as a set of user-selectable responses or supported actions, e.g., in the form of buttons. Various information related to the notification may be returned synchronously or asynchronously as appropriate, e.g., information may be synchronously returned indicating that the notification was successfully received, while other information may be asynchronously returned, such as when the viewer of the notification chooses a response. The notification API may be the same regardless of the type of auxiliary device.

In addition to working with auxiliary displays such as mobile telephones and secondary computers, the present invention may be used to extend the ability of the main computer system to communicate with previously single-purpose devices, such as televisions, radios, other media players, digital image-based picture frames, alarm clocks, and so forth. With some software and little or no hardware additions, such existing devices may easily expand their utility by allowing them to integrate with a main computer system. The platform is extensible in hardware and software to enable such scenarios. At the same time, the task of communicating with an auxiliary device from the perspective of independent software vendors is greatly simplified because application program code only needs to be written once to have it run on a wide variety of devices, with no additional work required to adapt the program for different auxiliary devices.

Other advantages will become apparent from the following detailed description when taken in conjunction with the drawings, in which:

DETAILED DESCRIPTION

Exemplary Operating Environment

Figure 1:
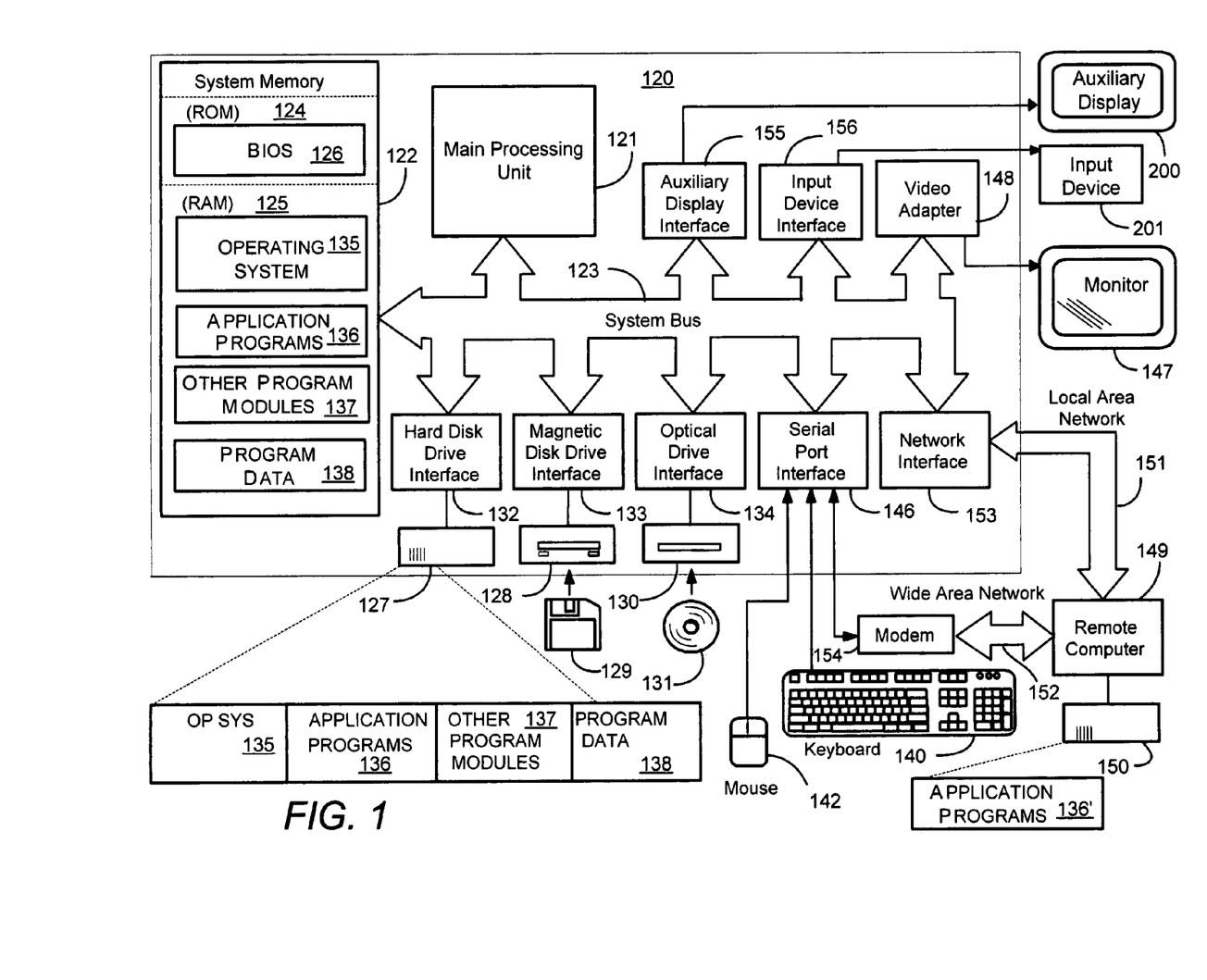
FIG. 1 is a block diagram representing a general purpose computing device in the form of a conventional personal computer system into which the present invention may be incorporated.

FIG. 1 is a block diagram representing a computing device 120 in the form of a personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display 200 is an additional output device, and may, for example, be connected to the system bus 123 via an auxiliary display interface 155. An auxiliary display 200 may also connect to a computing device 120 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be part of the auxiliary display device, but alternatively may be independent thereof and connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary device to work in accordance with the present invention. Indeed, an auxiliary device may still work when the computer is powered down, at least to a default extent or to an extent configured by a user, such as when the computer system is in a sleep state or a hibernate mode, and/or when the user has not yet logged on or is otherwise locked out of the system via security mechanisms.

The auxiliary device may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). The auxiliary device may play audio and/or video, show images, show calendar information, show emails and so forth.

To enable and control communication in these powered-down modes, firmware may exist, stored in non-volatile memory, which when loaded and operated on by a secondary processor, enables the auxiliary display, along with other auxiliary components to be used, as long as some power is available. Note that as used herein, the terms "firmware" and "device hardware" are essentially equivalent, and can be generally considered as representing the auxiliary memory, the code therein and/or the secondary processor on which it runs.

Figure 2A:
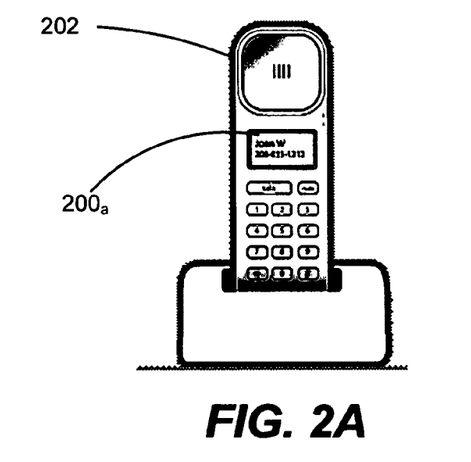
FIGS. 2A-2E are exemplary illustrations generally representing locations for placement of the auxiliary display on various devices.
Figure 2B:
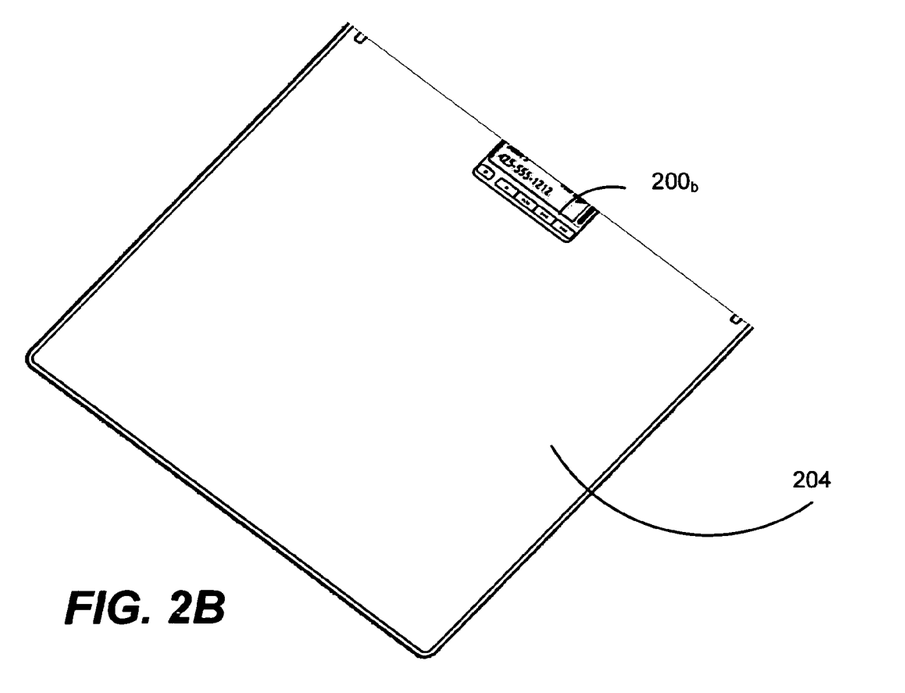
Figure 2C:
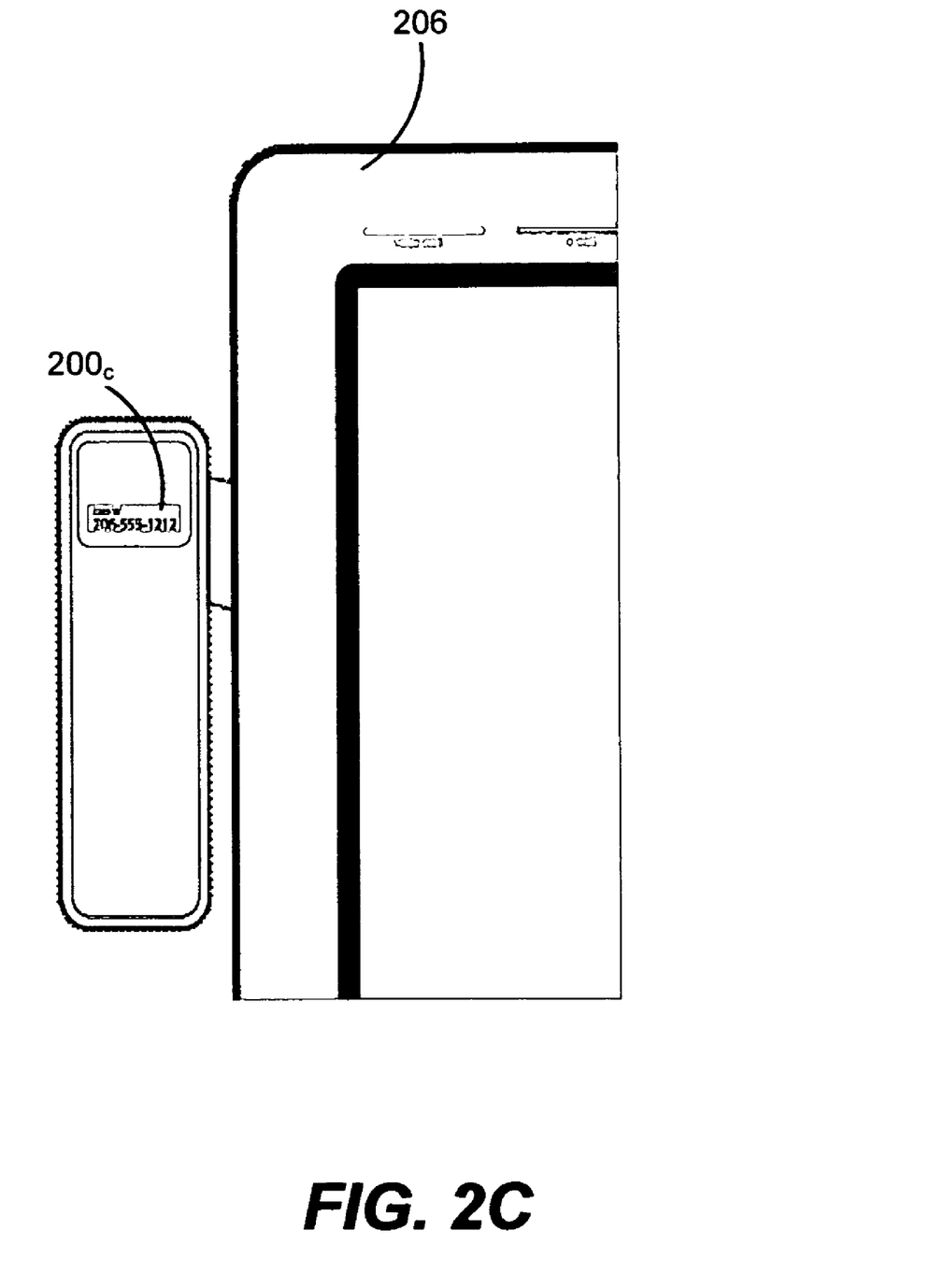
Figure 2D:
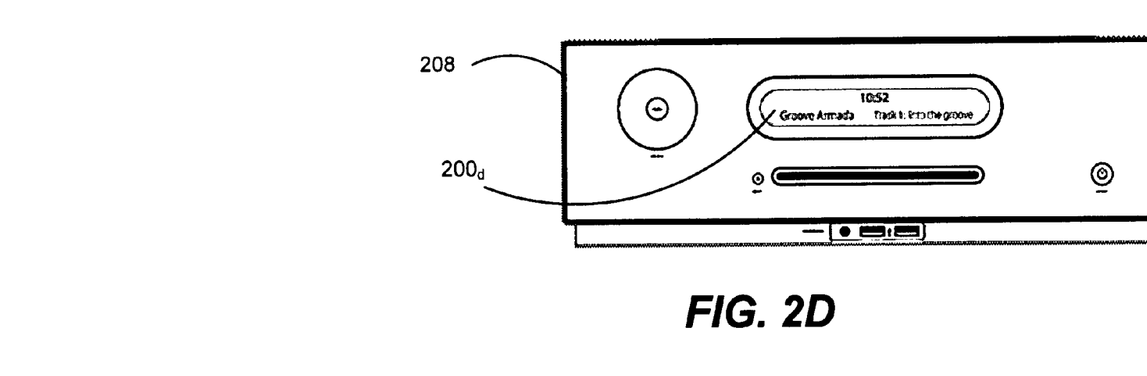
Figure 2E:
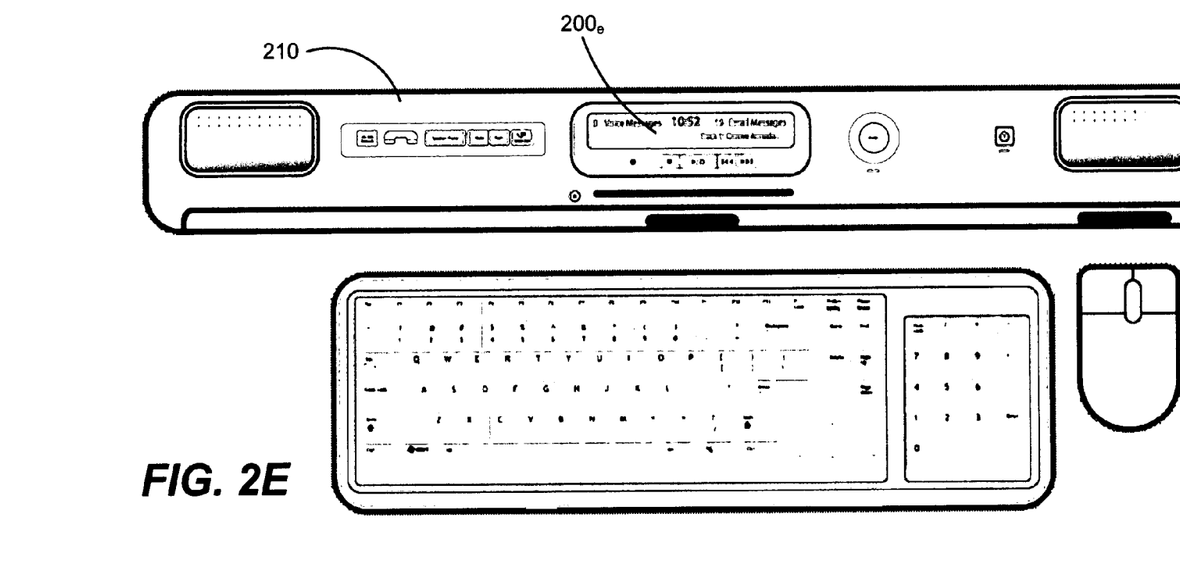

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200_d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth. Indeed, the auxiliary display need not be physically close to the main computer system, as the connection may be over a LAN or WAN, or even over the internet.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (PDA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

An auxiliary device may provide functionality even without a screen, or when its screen is powered down. For example, an auxiliary device may play audio, collect data (e.g., for later download to the main computer), perform calculations and so forth. Also, the display may comprise one or more LEDs or the like rather than a full screen. Thus, although many benefits and advantages arise from having an auxiliary display screen, and thus an auxiliary device may be referred to herein as an auxiliary display, a display is not required. In general, an auxiliary display, as referred to herein, may be composed of essentially anything that can be sensed, including any visual, audible, and/or tactile representations.

Exchanging Data with Auxiliary Displays

The present invention is generally directed towards communication with auxiliary devices, such as to provide notifications and other content for display on the auxiliary device, and possibly to obtain return information from the device, such as based on user interaction with the auxiliary device. As will be understood, there are many types of devices that can serve as an auxiliary display device, including those that do not necessarily have displays but can provide some output such as a sound or light. Although a number of examples are used herein, including displays on laptop lids, mobile phones, pocket-sized personal computers, digital image-based picture frames, kitchen displays, televisions, media players, clocks including alarm clocks, watches and so forth, the present invention is not limited to any of these examples, but rather anticipates the use of any device capable of outputting sensory information, even when referred to as an auxiliary "display." For example, other types of devices include auxiliary devices embedded within or using the main display of a consumer electronics device, (such as a refrigerator, home theater receiver, DVD player, and so forth), wall displays, automotive, transportation or other vehicular units (e.g., using displays already in a car/train/plane as an auxiliary display), keyboards or other input devices of the main computer system, PDAs (including non-cellular telephone PDAs), and the like. Similarly, the present invention is not limited to any particular mechanism for coupling the auxiliary display to another computer system, and thus is not limited to the wired or wireless examples used herein. The connection may be relatively close or relatively distant, essentially anywhere, such as over a LAN or WAN, or over a virtual private connection over the Internet.

Figure 3:
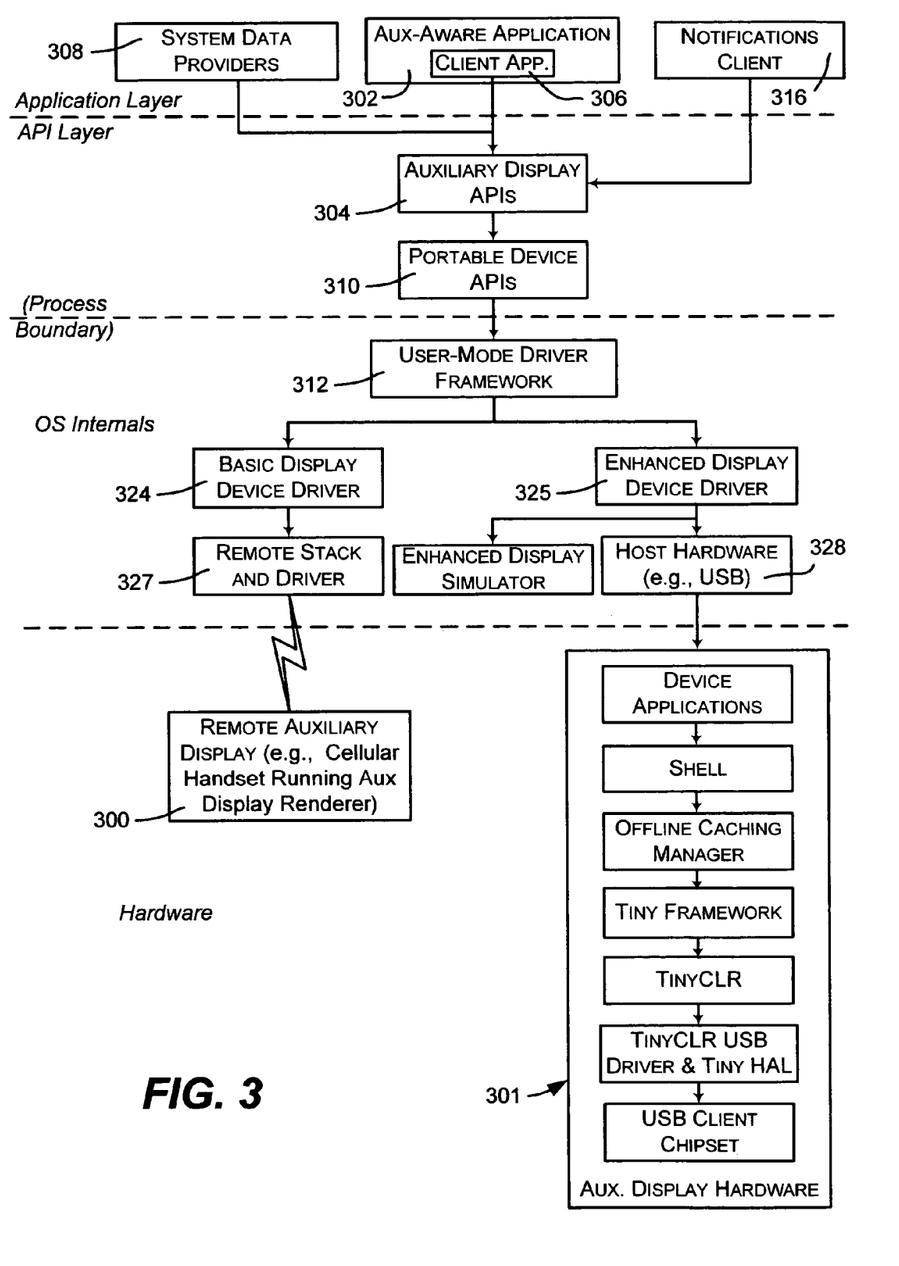
FIG. 3 is a block diagram generally representing an example layered architecture by which application programs can exchange data with the firmware of an arbitrary auxiliary display device in accordance with an aspect of the present invention.

Turning to FIG. 3 of the drawings, there is shown an example architecture that exposes auxiliary devices 300 and/or 301 to clients comprising application programs 302 and other programs (e.g., operating system components) via an auxiliary display API set 304. The API 304 provides APIs for various functions, including registering a client application 306 (a component of the program or possibly the program itself) with the system, sending content to the attached devices, sending notifications to the attached devices, and receiving events from the attached devices. Note that although in the described example the auxiliary display API set 304 contains a notifications API set, having a separate notifications API set is equivalent. Events may include navigation events, content request events, content change events, and so forth.

In keeping with an aspect of the present invention, the use of the API set 304 exposes only an "auxiliary display system" to the clients; there is no direct access to individual devices. As a result, for an independent software vendor, after registering a program component as a client application (via the API set 304), content may be sent to any auxiliary device using another call to the same API set 304, regardless of the device's actual type and capabilities. Although the user experience may differ, the program need not adapt to the auxiliary device that is present. Note that while an application program can obtain capability information about the auxiliary device, and may choose to act differently based on the capabilities, the application program need not do so in order to use the device. This is because the present invention provides an architecture that handles further communications, freeing the application program from the complex tasks including tailoring data to any particular device.

The API layer 304 is written on a portable device API set 310, which communicates with the device's driver process via user-mode driver framework 312. The portable device API set 310 maps the auxiliary display into a category of portable devices and it allows enumeration of the device's capabilities. This is encapsulated within the user-mode driver, however, and not exposed to the client application 306.

In general, the client application 306 sends notifications directly to the auxiliary device. The device is capable of displaying notifications, as well as generating its own notifications based on the data provided from the main computer system. Other (optional) components shown in FIG. 3 include a notifications client 316 that can provide notifications on the auxiliary display. For example, even when an application program such as a calendar program is not running, it may be desirable to provide scheduled notifications corresponding to that program; the notifications client 316 enables such scenarios. Note that as described below with reference to FIGS. 4-6, the components below the application layer and above the device drivers 324 and 325 may be generally referred to as the "auxiliary display platform."

Turning to the hardware vendor's perspective, in general, each auxiliary display vendor provides a corresponding auxiliary device driver 324, although if the device is built in a certain way, the device driver may be supplied by the provider of the auxiliary display platform. More particularly, as described below, certain types of auxiliary devices are considered "enhanced" displays because they are configured with certain firmware that among other things is generally compatible with any information that can be received via the APIs 304. For such devices, the device driver 325 may be generic, (and thus may be provided by the auxiliary display platform provider), generally operating to perform some straightforward tasks, such as to convert the API-received information to a proprietary format understood by the auxiliary device firmware. For other auxiliary devices, referred to herein as "basic" displays, the driver needs to be compatible with the device's capabilities, and thus the auxiliary display vendor needs to provide a driver customized to that device or class of devices.

In any event, the user mode driver framework provides a device driver interface (DDI) for coupling device drivers (e.g., 324 and 325) to the auxiliary display platform. The drivers then forward data corresponding to the API-received information to an appropriate hardware interface (transport) for communication to the auxiliary display device. For example, in FIG. 3, the basic device driver 324 is shown as forwarding data (via a previously defined protocol) to the remote stack and driver 327 for wireless (e.g., Bluetooth, Wi-FI, AM/FM infrared and so forth) communication to the device 300, whereas the enhanced device driver 325 is shown as forwarding data to USB-based hardware 328, although other types of transports including network transports such as TCP/IP-based transports are feasible. As is understood, these connections are only shown for example purposes, as any device driver will forward data for wireless or wired communication as appropriate.

Figure 4:
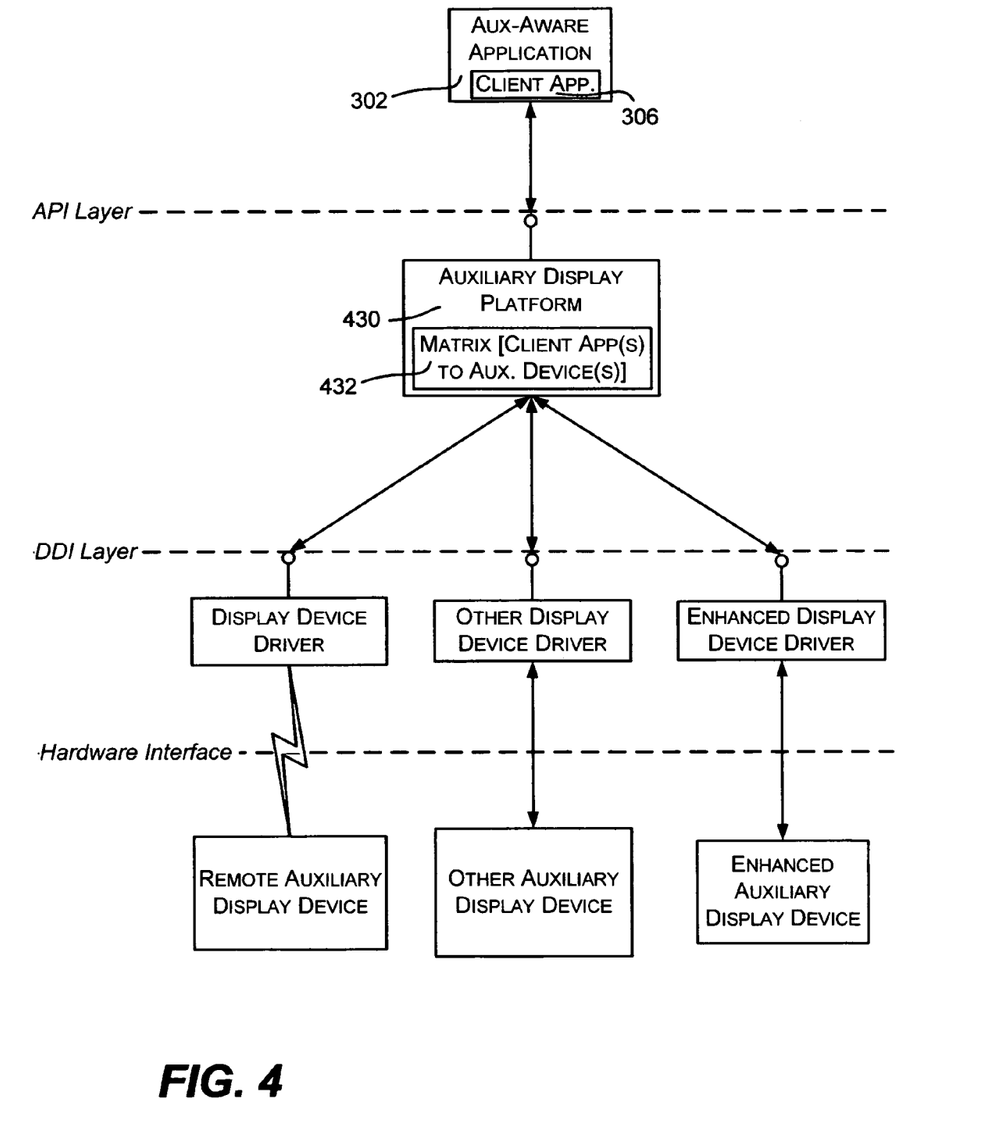
FIG. 4 is an example representation of how in one implementation, an auxiliary-aware application program interfaces with the auxiliary display platform to exchange data with multiple auxiliary display devices, in accordance with an aspect of the present invention.

Note that as represented in FIG. 4, multiple devices may be coupled to a computer to serve as an auxiliary display at the same time. A user may configure (e.g., via a control panel or the like of a system data providers component 308) which client applications' data are displayed on which devices. The system data provider 308 also supplies system information such as time data, wireless signal strength data, the computer's audio volume and mute state, and/or battery level data to auxiliary displays. In one implementation, the auxiliary display platform 430 consults a system-maintained matrix 432 whenever a client application 306 sends content, to determine which device or devices are to receive the information. Some translation of content for different device types may occur at this level, as well as possibly at other levels above the device driver level and in the device driver, as described below. The API of the auxiliary display platform 430 will also send events and the like from auxiliary devices to the application client application, again using the matrix to route the events back to the client application (or client applications) as appropriate.

As described below, some of the content that may be downloaded to an auxiliary device comprises notifications. When a user dismisses a notification on one auxiliary device, the user generally wants that notification dismissed on other auxiliary devices (an option which may be user-configurable). To this end, when the return information communicated from an auxiliary device indicates that a particular notification was dismissed, the auxiliary display platform sends a dismissal instruction to the other (still-connected) auxiliary devices to which that notification had been routed.

Figure 5:
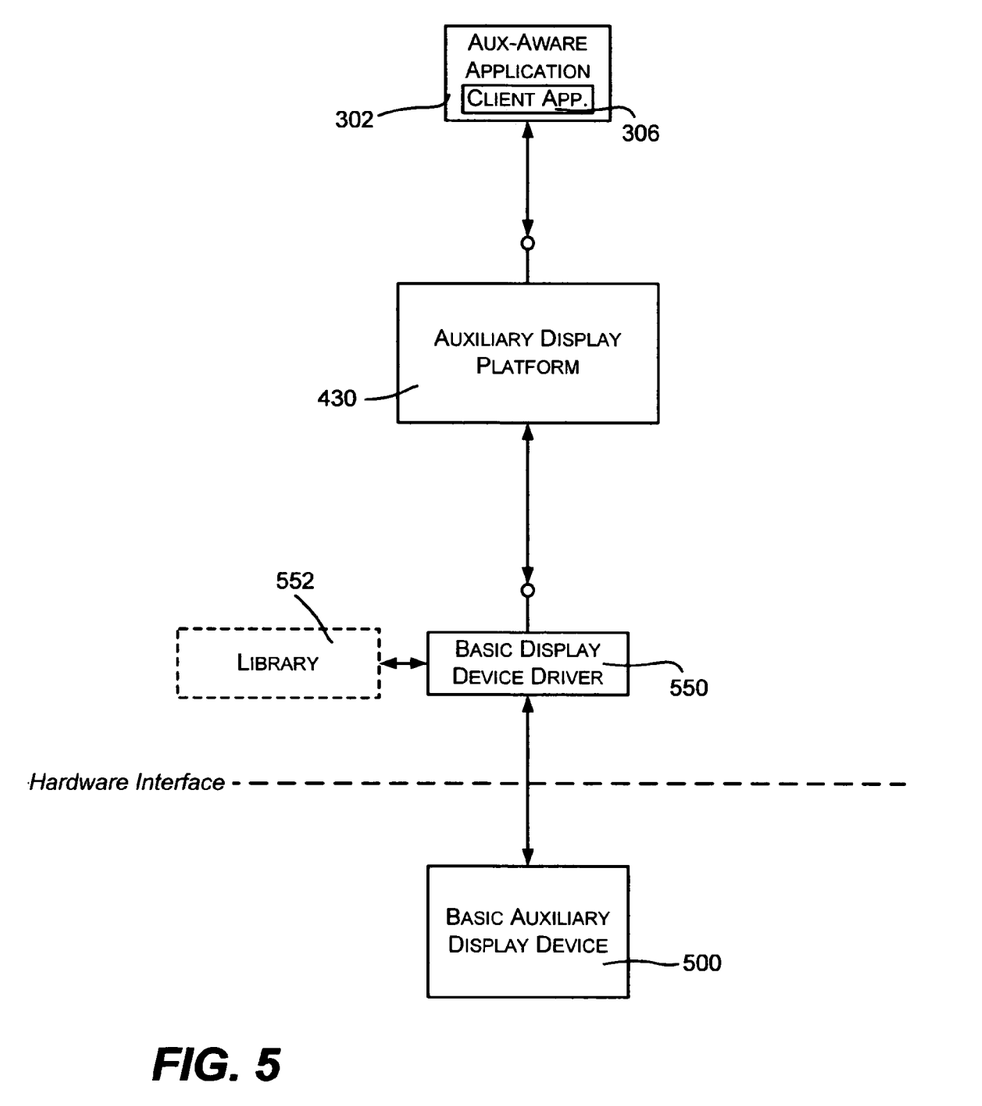
FIG. 5 is an example representation of how in one implementation, an auxiliary-aware application program interfaces with the auxiliary display platform to exchange data with a basic auxiliary display device, in accordance with an aspect of the present invention.
Figure 6:
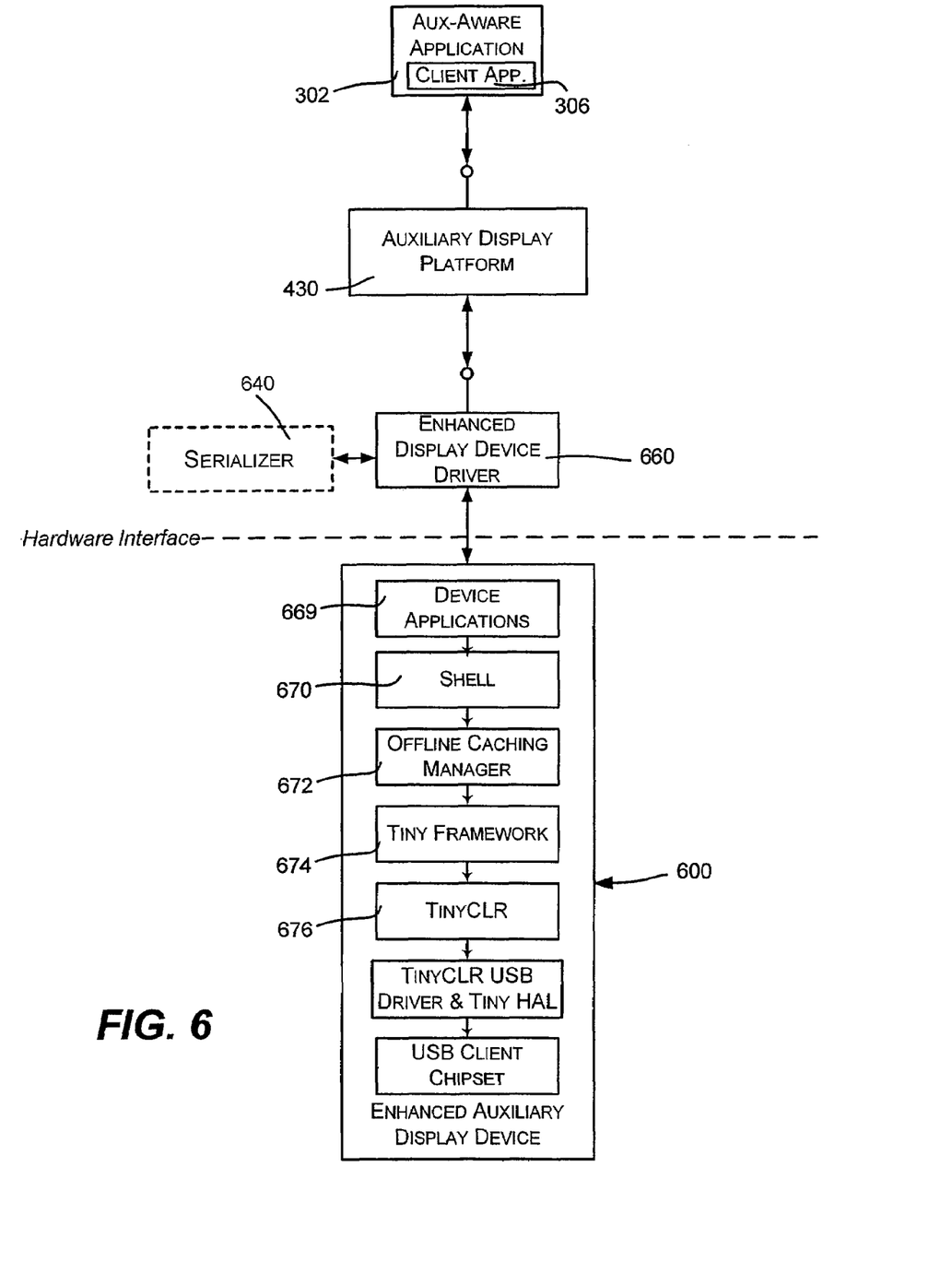
FIG. 6 is an example representation of how in one implementation, an auxiliary-aware application program interfaces with the auxiliary display platform to exchange data with an enhanced auxiliary display device, in accordance with an aspect of the present invention.

Turning to FIGS. 5 and 6, an "enhanced" display is one that runs a particular firmware stack known to the auxiliary display platform. For example, in one present implementation, such a firmware stack includes a TinyCLR component and supports TinyCLR object serialization. A basic display is any display that does not run a stack known to the auxiliary display platform.

FIG. 5 is a representation of components for using a basic display 500 as an auxiliary display. In general, the program 302 makes an API call to the auxiliary display platform 430 as described above. The auxiliary display platform 430, which knows which device (or devices) to send the auxiliary information, also knows whether each device is an enhanced display or a basic display. In this example, the device is a basic display 500, and thus the auxiliary device transfers the data, provided in a basic content format as an API parameter, that any basic device driver supports.

One such basic content format is XML-based, and thus the basic device driver 550 needs to be able to parse XML. If desired, a library 552 including functionality that calls to a system XML parser may be leveraged by the device driver. The device driver 550 filters and/or transforms the information as necessary for its particular device, and forwards it to a transport for communication to the basic auxiliary display device.

As can be seen, the platform is extensible such that basic devices are supported with little or no changes. In general, the only component necessary is a device driver for that specific device.

In some instances, basic devices may be run with no firmware/software changes to the device. For example, certain devices already respond to modem commands (GSM AT) and can output data. Thus, the device driver 550 (or possibly a higher-level component) may transform the data and insert appropriate modem commands, whereby the auxiliary device will display data with no hardware change or reprogramming necessary. Any other format and/or defined interaction mechanism that other devices already support may be similarly used.

However, this is not always possible, and thus some auxiliary devices will need additional firmware to work as an auxiliary display. Note that some auxiliary devices allow code to be downloaded and run on the device. In any event, in order to function as an auxiliary display, it is up to the device vendor to decide what capabilities to provide with a basic device, and how to divide functionality between the device driver (also typically provided by the device vendor) and the device firmware.

As is understood, there are thus at least two levels at which data may be converted, filtered and/or transformed before being communicated to the basic auxiliary display 500, namely in the auxiliary display platform and in the device driver 550. As one general goal is to make the program's API calls independent of any particular device type, the converter may thus need to vary depending on the device's capabilities, as device drivers are typically intended to be kept relatively small.

As one example, notifications should generally use the same notification API from the perspective of the program 302 regardless of device capabilities. Thus, a title, text and optional information such as images, icons, controls (e.g., buttons), menus and so forth may be specified as parameters. Devices not capable of graphics will have the information stripped of anything other than the text, and even the text may be modified to fit a particular device display, such as by alternating lines over time.

As another example, an API is provided for content download, such as to populate a cache on the device. In the event that the device does not have a cache and defined navigational framework, the auxiliary display platform can provide a navigational framework, performing tasks such as fetching a next item upon request, supplying a different bitmap that corresponds to a different page upon a link being selected, and so forth.

Turning to FIG. 6, for an enhanced device 600, essentially the only requirement is to establish a data pipe and pass in serialized objects, e.g., via a serializer 640. A user-mode driver may work for all enhanced displays, regardless of connection type, however it is likely more straightforward to use one driver per device per connection type. In any event, the driver 660 is responsible for translating the API-provided data and commands into something that the TinyCLR-based device is capable of understanding. In general, because the firmware operation is well-known to the provider of the auxiliary display platform, the objects that are passed can be essentially anything that the auxiliary display platform, enhanced device driver and enhanced device agree upon.

Content may generally be downloaded to a cache on the enhanced device, and the device itself will then handle the content as desired. Note that this allows for disconnected usage, as well as having multiple applications running on the system provide content, with one application being run at a time to access the cached content on the auxiliary display. Notifications will impose on the current running application, by design. Notifications may be arranged for presentation in any suitable ordering, such as in a FIFO (first-in first-out) manner, although as can be readily appreciated, there may be a different priority among types of notifications (e.g., an urgent, recent or otherwise-flagged notification may be given a higher priority than a regular or old notification).

In one implementation, represented in FIG. 6, to navigate and display cached content, device applications 669 and a shell program 670 run on a TinyCLR framework 674 and component 676, which interprets, navigates, and displays the data. In general, the shell program 670 provides a home page, non-client area (an area on the device's screen which is always visible when the display is on no matter what other content is being displayed on the device, typically used to display commonly needed things, such as a clock, a battery indicator, a network indicator), menus and the general look and feel of the auxiliary display device. The data provided may be in the form of or modified into a directed graph of screens, each of which is a visual tree of TinyCLR View objects rooted by a TinyCLR Form object. The shell layer receives user interaction events from the lower layers of the firmware, interprets them, and navigates around in the data as appropriate. The shell program 670 also accepts notification requests from the main computer system via the auxiliary display platform as described above, and issues requests to the main computer system to provide new content when it learns from the caching manager 672 that content is needed (e.g., missing). The shell program 670 also displays timed notifications, which can occur when the main computer system is not connected.

The offline caching manager 672 comprises an assembly, written on top of the TinyCLR 676, which manages the cache of data items stored on the device. This component also performs some memory management, dealing with the fact that system application programs may provide more data than the device can store. If the firmware modifies the data cache, this component tracks that information, and posts events to the application program on the system to let it know either immediately if the main computer system is online, or if not online, when the machine comes back online. The cache manager may be exposed to the driver 660 via an interface.

It should be noted that auxiliary devices may be configured by their manufacturer to have expanded capabilities beyond those described above. To this end, one or more hardware components may be added, along with a driver in the stack to expose any new components to the auxiliary device and the rest of the auxiliary display platform. Such hardware extensions are described in copending U.S. patent application entitled "Extensible Architecture for Auxiliary Displays" filed concurrently herewith and incorporated by reference herein.

Notification Examples and APIS

As described above, applications and other client mechanisms may provide notifications to auxiliary displays, including cell phones, PDAs, and so forth using the auxiliary display platform. This allows the user to receive and respond to specific notifications on a device other than the main computer system. In addition to displaying a notification on the auxiliary device, the notification can require a response from the user, thus effecting a corresponding action on the main computer system, whether immediate when connected or deferred upon later reconnection. The action can be essentially anything that makes sense for the sender of the original notification at the time the response is received, such as merely noting that the notification received a response, and/or sending a instant message or email message, dialing a telephone number, closing the program that sent the notification, changing program state, sending another notification, powering down the main computer system (e.g., the notification may indicate a critically low-power state) and so forth.

When a program issues a notification, the notification may be evaluated by the auxiliary platform to determine how to handle the notification. For example, as described above, users may specify whether notifications are routed to connected auxiliary displays, and if so, to which ones. This may be determined per notification type. The auxiliary platform determines the current set of devices on which the notifications should be displayed, (e.g., gathered from a control panel setting), extracts the relevant data from the notification, and routes that data to the appropriate auxiliary device or devices. The device may then display the notification in the manner most suited to the device capabilities, which may be determined by filtering at a driver level or higher level, as described above.

When the notification includes controls and the like and the auxiliary device is capable of displaying them, the controls (e.g. buttons) may be displayed, from which the user is able to select among one or more options. The users' selection is sent from the device back to the auxiliary display platform, where it is relayed back to the original notification sender to perform some associated action. As also described above, when a user dismisses a notification on one device, the auxiliary display platform may dismiss the notification from any other devices that it was sent to. The platform is also capable of handling cancelled notifications.

Via the APIs, as described above, applications may configure notifications that contain text, graphics, icons and so forth. Controls may be added, by which the user can interact and respond; the system, such as in the shell, can provide a mechanism for handling the response when the application that sent the notification is no longer alive to handle the response event. The controls may be associated with an identifier such as a tag for identifying the control corresponding to the response.

An API may be provided to allow the caller to revoke a notification that has already been sent. In this way, the notification may be made to disappear from the auxiliary device or devices to which it was sent. Also, an API may be provided for an application to check if an auxiliary device's current context allows the notification to be shown before sending the notification. For example, the user might be in full screen presentation program mode, in which case the context of the user might not allow the notification to be shown. As part of the application's preparing to send the notification, the application can call this method to obtain the user's context. A callback when the context changes can also be requested. Other API calls may include a request to suppress notifications from other applications.

Via the APIs, notifications may be sent from applications through the auxiliary platform, whereby notifications may appear on any auxiliary device, such as a television, a wall display, a kitchen display and so forth. A user may have one or more dedicated notification-only devices, and there may be notification-only applications, and a user may configure these in accordance with the auxiliary platform. With the rich functionality of the present invention, notifications may display text, images, icons, and further enable responses, user-selectable items, actions, and so forth. Notifications may be seamlessly tied into an existing notification mechanism of the main computer system, to provide a seamless notification experience across the main computer system and the auxiliary devices.

CONCLUSION

As can be seen from the foregoing, the present invention provides an auxiliary display platform by which application programs may be written to communicate information including notifications to auxiliary displays, independent of the type of auxiliary display device actually in use. At the same time, the auxiliary display platform enables manufacturers of hardware devices to have those devices used as auxiliary displays, including for displaying notifications, with little if any change to the hardware. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment having a main computer system and an auxiliary device coupled thereto, the auxiliary device configured to operate in at least one context that does not allow notifications from the main computing system to be displayed at the auxiliary device and configured to operate in at least one context that does allow notifications from the main computing system to be displayed at the auxiliary device, a method comprising:
    on the main computer system, an application generating a notification and formatting a notification parameter set for displaying the notification on the auxiliary device;
    the application calling an interface to obtain a current context of the auxiliary device;
    at the application, receiving a current context of the auxiliary device, the current context being one of the at least one contexts that does not allow notifications to be displayed at the auxiliary device, the current context indicative of the auxiliary device being in a full-screen presentation mode that does not permit notifications to be displayed;
    the application requesting a callback when the current context changes;
    at the application, receiving a change to the current context, the changed current context being one of the at least one contexts that does allow notifications to be displayed at the auxiliary device, the current changed context indicative of the auxiliary device being in a program mode that does permit notifications to be displayed; and
    the application calling the interface with the notification parameter set to request that the notification be displayed on the auxiliary device through a user-mode driver framework, wherein requesting that the notification be displayed includes:
        determining whether the auxiliary device is an enhanced auxiliary device or a basic auxiliary device, wherein an enhanced auxiliary device is distinguished from a basic auxiliary device by having certain firmware that is generally compatible with any information received through the user-mode driver framework;
        when the auxiliary device is determined to be an enhanced auxiliary device, communicating the notification parameter through a generic driver that is not specific to the enhanced auxiliary device; and
        when the auxiliary device is determined to be a basic auxiliary device, communicating the notification parameter through a device-specific driver to the basic auxiliary device.

2. The method of claim 1 wherein formatting the notification parameter set comprises specifying text data to appear in association with the notification.

3. The method of claim 2 wherein specifying text data comprises providing text data to appear in a header of the notification.

4. The method of claim 2 wherein specifying text data comprises providing text data to appear in a body of the notification.

5. The method of claim 1 wherein formatting the notification parameter set comprises specifying image data to appear in association with the notification.

6. The method of claim 1 wherein formatting the notification parameter set comprises specifying sound data to appear in association with the notification.

7. The method of claim 1 wherein formatting the notification parameter set comprises specifying a set of at least one control to appear in association with the notification.

8. The method of claim 7 wherein formatting the notification parameter set comprises specifying a property that associates an object with a control of the set.

9. The method of claim 7 further comprising, receiving information indicating that a control of the set was selected, and in response, performing an action.

10. The method of claim 7 wherein the set comprises at least one button.

11. The method of claim 1 wherein calling the interface comprises calling a send function of a notification API of an auxiliary platform.

12. The method of claim 1 further comprising, calling the interface to attempt to revoke the notification.

13. The method of claim 1 further comprising, calling the interface to request that notifications requested by other callers to the interface be suppressed.

14. At least one computer-readable medium having computer-executable instructions which when executed perform the method of claim 1.

15. In a computing environment, a method comprising:
    at an auxiliary device coupled to a main computer system:
        receiving a call from an application of the main computer system to obtain a current context of the auxiliary device, wherein the application generates notification data;
        determining that the auxiliary device is in a program mode that does not allow notifications to be displayed and notifying the application of the main computer system of the program mode;
        receiving a request for a callback when the current context changes;
        sending a current context for the auxiliary device to the application of the main computer system when the auxiliary device is in a program mode that allows notifications to be displayed;
        after sending the current context when the auxiliary device is in a program mode that allows notifications to be displayed, receiving notification data from the application on the main computer system through a user-mode driver framework, subsequent to sending the current context to the main computer system; and
        receiving the notification data from the application and processing the notification data to output a notification on the auxiliary device, wherein receiving the notification data from the application includes:
            when the auxiliary device is an enhanced auxiliary device, receiving the notification data through a generic driver that is not specific to the auxiliary device; and
            when the auxiliary device is a basic auxiliary device, receiving the notification data through a driver that is specific to the auxiliary device, wherein an enhanced auxiliary device is distinguished from a basic auxiliary device by having certain firmware that is generally compatible with any information received through the user-mode driver framework.

16. The method of claim 15 wherein processing the notification data comprises outputting text data to a display as at least part of the notification.

17. The method of claim 15 wherein processing the notification data comprises outputting image data to a display as at least part of the notification.

18. The method of claim 15 wherein processing the notification data comprises outputting sound data as at least part of the notification.

19. The method of claim 15 wherein processing the notification data comprises outputting a control to a display as at least part of the notification.

20. The method of claim 19 further comprising, detecting that the control was selected, and in response, performing an action.

21. The method of claim 20 wherein performing the action comprises returning information to the main computer system indicating that the control was selected.

22. At least one computer-readable medium having computer-executable instructions which when executed perform the method of claim 15.

23. In a computing environment having a main computer system and an auxiliary device coupled thereto, a system comprising:
    one or more processors on the main computer system; and
    an auxiliary platform on the main computer system and coupled to the one or more processors, the auxiliary platform including:
        a context interface that receives calls from a program running on the main computer system, including a call checking the current context of the auxiliary device to determine when the auxiliary device is in a program mode that does allow notifications from the main computing system to be displayed at the auxiliary device and when the auxiliary device is in a program mode that does not allow notifications from the main computing system to be displayed at the auxiliary device;
        a notification interface that receives calls from the program running on the main computer system, including a call having a set of at least one notification parameter corresponding to a notification to communicate to the auxiliary device, the set of at least one parameter independent of any particular auxiliary device hardware;
        a user-mode driver framework that couples the auxiliary platform to a device driver associated with the auxiliary device; and
    wherein the auxiliary platform converts the notification into notification data in a format understood by the device driver such that the device driver forwards the notification data for communication to the auxiliary device, wherein the device driver is a generic driver that is not specific to the auxiliary device when the auxiliary device is an enhanced auxiliary device, and wherein the device driver is device-specific when the auxiliary device is a basic auxiliary device, and wherein an enhanced auxiliary device is distinguished from a basic auxiliary device by having certain firmware that is generally compatible with any information received through the user-mode driver framework.

24. The system of claim 23 wherein the auxiliary device comprises a mobile communications device.

25. The system of claim 23 wherein the auxiliary device comprises a device from among a set of device types, the set containing: a separate computer; a mobile communications device; a secondary display screen with actuators; a watch; a wall display; a display screen; a digital picture frame; a clock; a television; a radio; a media player; a device embedded within or using the main display of a consumer electronics device; automotive, transportation or other vehicular units; keyboards or other input devices of the main computer system; a pager; and a personal digital assistant.

26. The system of claim 23 wherein the device driver filters at least some of the notification data based on capabilities of its associated auxiliary device.

27. The system of claim 23 wherein a second auxiliary device is connected to the computer system, and wherein the auxiliary platform maintains a data structure that contains data as to which auxiliary device or devices the notification data is to be routed for the program running on the main computer system.

28. The system of claim 27 wherein the data indicates that the notification data is to be routed to the second auxiliary device, wherein the second auxiliary device includes a corresponding device driver for the second auxiliary device, and wherein the auxiliary platform routes the notification data to the device driver for the second auxiliary device.

29. The system of claim 23 wherein the device driver sends return information to the auxiliary platform in response to the information forwarded for communication to the auxiliary device.

30. The system of claim 29 wherein the return information corresponds to user interaction with the auxiliary device.

31. At least one computer-readable medium having computer-executable instructions which when executed perform steps, comprising:
    at a computer program running on the main computer system, generating a notification and preparing to send the notification for display on an auxiliary device, wherein preparing to send the notification includes:
        the computer program calling an application programming interface (API) to obtain a context representative of a current context of the auxiliary device, wherein the API provides a structured format for such calls and is independent of a type of auxiliary device;
        at the computer program, receiving a context indicative of the auxiliary device being in a presentation program mode that does not allow notifications to be displayed;
        the computer program requesting a callback for when the auxiliary device changes to a program mode that does allow notifications to be displayed;
        at the computer program, receiving a callback providing a context indicative that the auxiliary device is in a program mode that does allow notifications to be displayed;
    after determining that the program mode of the auxiliary device does allow notifications to be displayed, the computer program running on the main computer system calling an interface and sending a notification, the notification including a call having a set of at least one parameter corresponding to notification data to communicate to one or more auxiliary devices, the set of at least one parameter independent of any particular auxiliary device hardware;
    determining to which one or ones of a plurality of auxiliary devices coupled to the main computer system the notification data should be communicated, the one or ones of the plurality of auxiliary devices including at least an auxiliary device dedicated to receipt of notifications, and for each such device:
        a) accessing the notification data;
        b) determining whether each such auxiliary device is an enhanced auxiliary device or a basic auxiliary device, wherein an enhanced auxiliary device is distinguished from a basic auxiliary device by having certain firmware that is generally compatible with any information received through the API;

c) for each of the one or ones of the plurality of auxiliary devices that is an enhanced auxiliary device, converting the notification data to a format understood by a user-mode device driver of that enhanced auxiliary device, wherein the user-mode device driver is a generic driver that is not specific to the enhanced auxiliary device and is adapted to translate the notification data into a format understood by that enhanced auxiliary device;

d) for each of the one or ones of the plurality of auxiliary devices that is a basic auxiliary device, converting the notification data to a format understood by a device driver for that basic auxiliary device, wherein the device driver for that basic auxiliary device is specific to that basic auxiliary device and is adapted to translate the notification data to a format understood by that basic auxiliary device and to filter the information suitable to display capabilities of that basic auxiliary device; and e) communicating the notification data to that auxiliary device;

receiving, from one of the auxiliary devices, an indication that a user has dismissed the notification; and transmitting to each other connected auxiliary device, a cancellation of the notification.

32. The computer-readable medium of claim 31 wherein the main computer system is coupled to a plurality of auxiliary displays, and at least one of the auxiliary displays comprises an enhanced auxiliary display.

33. The computer-readable medium of claim 31 wherein the main computer system is coupled to a plurality of auxiliary displays, and at least one of the auxiliary displays comprises a basic auxiliary display.

34. The computer-readable medium of claim 31 wherein the main computer system is coupled to a plurality of auxiliary displays, and at least one of the auxiliary displays comprises an enhanced auxiliary display and at least one other of the auxiliary displays comprises a basic auxiliary display.

* * * * *